United States Patent [19]

Minjolle

[11] Patent Number: 4,921,616

[45] Date of Patent: May 1, 1990

[54] ALVEOLAR CERAMIC FILTERS FOR HIGH MELTING METALS

[75] Inventor: Louis Minjolle, Tarbes, France

[73] Assignee: Ceramiques et Composites, Courbevoie, France

[21] Appl. No.: 271,356

[22] Filed: Nov. 10, 1988

Related U.S. Application Data

[63] Continuation of Ser. No. 26,898, Mar. 17, 1987, abandoned.

[30] Foreign Application Priority Data

Mar. 19, 1986 [FR] France .............................. 86 03888

[51] Int. Cl.$^5$ .................................................. C04B 35/10
[52] U.S. Cl. .................................. 210/767; 210/510.1; 75/407; 266/227; 55/523; 501/107
[58] Field of Search ............... 501/105, 107; 266/227; 75/20 R, 28; 210/510.1, 767; 55/523

[56] References Cited

U.S. PATENT DOCUMENTS

| 4,265,659 | 5/1981 | Blome | 210/510.1 X |
| 4,364,760 | 12/1982 | Higuchi et al. | 210/510.1 X |
| 4,416,676 | 11/1983 | Montierth | 210/510.1 X |

Primary Examiner—W. Gary Jones
Attorney, Agent, or Firm—Burns, Doane, Swecker & Mathis

[57] ABSTRACT

Shaped, porous filter members having a size and shape adapted for the filtration of liquid metals, e.g., the configuration of a honeycomb, are comprised of a porous alveolar ceramic material including from 10 to 20% $SiO_2$, from 50 to 60% $Al_2O_3$ and from 20 to 40% $ZrO_2$, each percentage being by weight with respect to the total weight of said oxides, said $Al_2O_3$ and $SiO_2$ being present in the form of mullite, $3Al_2O_3/2SiO_2$, and the combined weight of the zirconia and mullite comprising at least 90% by weight of said alveolar ceramic material.

10 Claims, No Drawings

ALVEOLAR CERAMIC FILTERS FOR HIGH MELTING METALS

This application is a continuation of application Ser. No. 026,898, filed Mar. 17, 1987, now abandoned.

BACKGROUND OF THE INVENTION

1. Field of the Invention

The present invention relates to a filter for liquid metals comprised of alveolar or honeycomb ceramic material, a process for the preparation thereof and its use in the filtration of liquid metals or alloys having very high melting points, such as steels, cast iron and refractory metallic alloys.

2. Description of the Prior Art

It is known to this art to use filters of alveolar ceramic materials based on zirconia or alumina for the filtration of liquid metals or alloys having very high melting points.

Such filters have the disadvantage of being excessively burdensome and often suffer from thermal fragility.

It is also known, in the automotive industry, to use less costly filters of cordierite, or an alveolar cordierite/mullite mixture, in the form of discs or foams. However, application of such filters are limited to a temperature of approximately 1,500° C., meaning that they cannot be used for filtration of molten steels which require a temperature of about 1,650° C.

SUMMARY OF THE INVENTION

Accordingly, a major object of the present invention is the provision of novel ceramic materials which are competitive in price, have good properties in regard to wetting by liquid metals and resistance to thermal shock at very high temperatures, and which are well adapted for use at temperatures on the order of 1,800° C.

Briefly, the present invention features novel filters for liquid metals based on alveolar ceramic materials having an open frontal, or face surface porosity of 50 to 80%, said ceramic material comprising from 10 to 20% $SiO_2$, from 50 to 60% $Al_2O_3$ and from 20 to 40% $ZrO_2$, the percentages being expressed by weight with respect to the total weight of the three oxides, wherein the $Al_2O_3$ and $SiO_2$ are associated as mullite, $3Al_2O_3/2SiO_2$, and further wherein the combined weight of the zirconia and mullite comprises at least 90% of the total weight thereof.

DETAILED DESCRIPTION OF THE PREFERRED EMBODIMENTS OF THE INVENTION

More particularly according to the present invention, the subject novel filters are advantageously produced by first admixing either the three separate oxides $SiO_2$, $Al_2O_3$ and $ZrO_2$, in accordance with a ratio by weight of $SiO_2/Al_2O_3/ZrO_2$ of 10-20/50-60/20-40, or admixing mullite and zirconia in accordance with a ratio by weight of mullite/zirconia of 60-80/20-40, or preferably a composition which is precursor of said mixture of $SiO_2$, $Al_2O_3$ and $ZrO_2$, containing from 45 to 55% by weight of zirconium silicate (preferably 50±1%) and from 45 to 55% by weight of alumina (preferably 50±1%); next shaping said mixture or the precursor composition to impart thereto an alveolar or honeycomb structure having an open frontal, or face surface porosity of from 50 to 80%; and then conforming the alveolar material thus produced to the desired configuration of the filter, either prior to or subsequent to a baking/sintering operation at a temperature on the order of 1,650° to 1,750° C.

When the starting material is a precursor composition, as aforesaid, the complete or partial chemical transformation of such composition into a mixture of oxides $SiO_2$, $Al_2O_3$, $2SiO_2$, $3Al_2O_3$ and $ZrO_2$ is accomplished over the course of the sintering operation.

The starting composition, namely, the mixture $SiO_2 + Al_2O_3 + ZrO_2$, the mullite/zirconia mixture, or the precursor composition of such mixture, is typically in particulate form, with the particle sizes being on the order of 1 to 5 μm.

The shaping operation is carried out using well-known methods, depending on the desired honeycomb or alveolar structure.

Thus, if the preparation of foams is desired, the most conventional method comprises preparing a suspension of the starting mixture (the slip) in water, the dry solids content being on the order of from 50 to 80%, generally about 65%, dipping therein an organic sponge with open cells of adequate frontal porosity, drying without heating, and then baking at a temperature on the order of 1,650° to 1,750° C. The product thus obtained is then cut into the desired form of the filter.

If production of a filter having a perforated structure of polygonal geometrical shape is desired, known extrusion processes can be used, in particular those described in U.S. Pat. Nos. 3,905,743 and 3,919,384, for example, which relate to the production of honeycomb structures having thin walls of constant thickness, beginning with the mixture of oxides or the precursor composition of such mixture and adding water and extrusion additives thereto, as is known to this art.

The water is used in a proportion of from 8 to 12% by weight with respect to the weight of oxides when the starting material is the mixture of oxides, or in a proportion of from 10 to 15% when the starting material is the precursor composition.

Exemplary of the conventional extrusion additives, the following are representative:

(i) plasticizers, such as organic gels or sizes of the polyvinyl alcohol, carboxymethylcellulose, etc., type, which are used in a proportion of 0 to 3% with respect to the weight of the oxides; and (ii) lubricants, such as greases, oils, waxes, and the like, which are used in proportion of from 0 to 15% with respect to the weight of oxides.

After the shaping operation, the unbaked material thus produced is dried to remove the free water therefrom, at a temperature on the order of 60° to 90° C., cut to the required shape and size for the filter and then baked at a sufficient temperature and for a sufficient period of time to provide a sintered ceramic material.

The baking and sintering operation is preferably carried out at a temperature of from 1,650° to 1,750° C., and maintaining such temperature for from 15 minutes to 2 hours.

In this manner, a filter material is produced having the following characteristics:

(a) a coefficient of linear expansion of less than $6.5 \cdot 10^{-6}/°$ C. at a temperature of from 20° to 1,000° C.;

(b) an open porosity of 0 to 30%;

(c) an apparent density on the order of 2.6 to 3.8.

Such characteristics render the filter particularly suitable for the filtration of liquid metals or metal alloys having very high melting points, in particular for the filtration of metals or alloys such as steel that are produced at a temperature of about 1,650° C. and even up to 1,800° C.

The filter is in the conventional form of filters of alveolar ceramic materials, for example, in the form of square plates, discs, and the like, the dimensions of which depend on the amount of metal or alloy to be filtered per unit time and the capacity of the filtration box wherein it is placed. The thickness of the filter is typically on the order of from 5 to 15 mm. When it has a perforated structure of polygonal geometrical shape, it may contain, for example, from 35 to 50 pathways per cm$^2$, square in section, and having side dimensions of 1 to 5 mm.

Filtration of liquid metals or alloys using the filters of the present invention is carried out according to known techniques; it enables the retention of coarse impurities mechanically, and of non-metallic inclusions (oxides, carbides, nitrides, halides, etc.) physically, by adsorption within the cellular system of the filter, even if the dimensions of such inclusions are less than the pore sizes of the filter.

In order to further illustrate the present invention and the advantage thereof, the following specific examples are given, it being understood that same are intended only as illustrative and in nowise limitative.

EXAMPLE 1

A mixture of 30.5% by weight of zirconia SCCA$_4$ (Magnesium Electron G.B.), 17% by weight of SiO$_2$ and 52% by weight of Al$_2$O$_3$, the SiO$_2$ and Al$_2$O$_3$ being in the form of electrically molten mullite (grade 150 from Cadwoods Refractories G.E.), was crushed in a ball-type crusher (or in a vibratory crusher), until particles having a mean diameter on the order to 2 μm were obtained.

Extrusion of the following composition was next carried out:
(i) 79.6% by weight of the particulate admixture as prepared above;
(ii) 9.6% by weight of technical vaseline 910, marketed by Gerland;
(iii) 1.2% by weight of polyvinyl alcohol Rhodoviol PS 125, marketed by Rhone-Poulenc; and
(iv) 9.6% by weight of water.

The aforesaid mixture was formulated into a paste in a mixer conventional to the ceramic industry (for example, of the kneader type, a mixer provided with Z-type arms, or a mixer having grinding stones).

The charge thus produced was extruded under a pressure of about 200 bars at a rate of 5 cm/sec, using an extruder or a press of screw type, provided with an extrusion die for producing a honeycomb structure comprising uniformly spaced interconnected discharge slots, forming a square grid at the outlet thereof, having side dimensions of 51 mm and 1.5 mm square openings spaced apart a distance of 0.34 mm.

The resulting uniform structure was then dried at a temperature of 90° C.

The dried structure, after contraction, was then cut in the shape of parallelepipeds having a square base with side dimensions of 49 mm and a height of 11 mm, and then baked in a gas oven at 1,700° C. for a period of time of 2 hours.

The filter thus obtained had the following properties and characteristics:

| Chemical properties of the material: | | |
|---|---|---|
| (a) Mineralogical composition | ZrO$_2$ | 30% |
|  | mullite | 70% |
| (b) Chemical composition | ZrO$_2$ + impurities of HfO$_2$ | 30.5% |
|  | Al$_2$O$_3$ | 52% |
|  | SiO$_2$ | 17% |
|  | Other oxides | 0.5% |
| Physical properties of the material: | | |
| (a) Apparent density | 3.23 | |
| (b) Open porosity | 15% | |
| (c) Coefficient of linear expansion at 20° to 1,000° C. | 6 10$^{-6}$/°C. | |
| Characteristics of the filter | | |
| (a) Size | 44.5 × 44.5 mm × mm | |
| (b) Thickness | 10 mm | |
| (c) Thickness of the walls | 0.3 mm | |
| (d) Flow section of the ducts | 1.3 × 1.3 mm × mm | |
| (e) Flow section of the filter | 14 cm$^2$ | |
| (f) Number of ducts per cm$^2$ | 39 | |
| (g) Open frontal porosity | 66% | |

The aforenoted properties and characteristics permitted the filter to be used for the filtration of spheroidal graphite cast iron which is used in the production of cylinder heads for diesel engines.

EXAMPLE 2

A composition was prepared from the following:
(i) 38.3% by weight of zirconium silicate (zircon);
(ii) 38.3% by weight of alumina;
(iii) 8.1% by weight of technical vaseline 910;
(iv) 1.4% by weight of polyvinyl alcohol, Rhodoviol PS 125;
(v) 13.9% by weight of water.

This composition was subjected to the paste-making, drying, cutting and baking/sintering operations described in Example 1.

The filter thus produced had the same properties and characteristics as that produced in Example 1.

EXAMPLE 3

A composition was prepared from the following:
(i) 30.5 parts by weight of zirconia SCCA$_4$;
(ii) 17.5 parts by weight of SiO$_2$ (duPont sand crushed to 2μ);
(iii) 52 parts by weight of alumina A 15 (Alcoa), to which the following were added:
(1) 12.1 parts by weight of technical vaseline 910;
(2) 1.5 part by weight of polyvinyl alcohol, Rhodoviol PS 125;
(3) 12.5 parts of water.

This composition was also subjected to the paste-making, drying, cutting and baking/sintering operations described in Example 1.

The filter thus obtained had identical properties and characteristics as those of the filter of Example 1.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A shaped, porous filter member having a size and shape adapted for the filtration of liquid metals, which comprises a porous alveolar ceramic material including from 10 to 20% $SiO_2$, from 50 to 60% $Al_2O_3$ and from 20 to 40% $ZrO_2$, each percentage being by weight with respect to the total weight of said oxides, said $Al_2O_3$ and $SiO_2$ being present in the form of mullite, $3Al_2O_3\cdot 2SiO_2$, and the combined weight of the zirconia and mullite comprising at least 90% by weight of said alveolar ceramic material wherein said porous alveolar ceramic material has a coefficient of linear expansion of less than $6.5 \times 10^{-6}/°$ C. at a temperature of from 20° C. to 1,000° C., an open porosity of 0 to 30% and an apparent density of about 2.6 to 3.8.

2. The porous filter member as defined by claim 1, having a face surface porosity of from 50 to 80%.

3. The porous filter member as defined by claim 2, having a thickness of from 5 to 15 mm.

4. The porous filter member as defined by claim 2, comprising a honeycomb shaped article.

5. The porous filter member as defined by claim 4, wherein said honeycomb shaped article further comprises a perforated structure of polygonal geometrical shape comprising from about 35 to about 50 pathways per $cm^2$, said pathways being square in section and having side dimensions of from about 1 to about 5 mm.

6. The porous filter member as defined by claim 1, wherein said liquid metal comprises steel.

7. The porous filter member as defined by claim 1, wherein said liquid metal comprises spheroidal graphite cast iron.

8. The porous filter member as defined by claim 1, wherein said ceramic material comprises 17% $SiO_2$, 52% $Al_2O_3$ and 30.5% $ZrO_2$, said combined weight of the zirconia and mullite comprising about 100% by weight of said alveolar ceramic material.

9. The porous filter member as defined by claim 1, wherein said filter member is suitable for filtering a liquid metal which is poured at a temperature of about 1650° to 1800° C.

10. A process for the filtration of a liquid metal having a high melting point, comprising filtering such liquid metal through the porous filter member as defined by claim 1.

* * * * *